United States Patent [19]
Emmerich et al.

[11] 4,123,848
[45] Nov. 7, 1978

[54] BLOCK PROFILE GAUGE

[75] Inventors: Kenneth C. Emmerich, Lexington; David L. Hunter, Versailles, both of Ky.

[73] Assignee: Fansteel Inc., North Chicago, Ill.

[21] Appl. No.: 801,764

[22] Filed: May 31, 1977

[51] Int. Cl.² .............................................. B27G 23/00
[52] U.S. Cl. ................................. 33/185 R; 33/181 R
[58] Field of Search ............ 33/185 R, 180 R, 181 R, 33/174 R

[56] References Cited
U.S. PATENT DOCUMENTS 2,523,597  9/1950  Scifres .................................. 33/185 R
2,827,711  3/1958  Elschlager .......................... 33/185 R Primary Examiner—Richard E. Aegerter
Assistant Examiner—Willis Little
Attorney, Agent, or Firm—Barnes, Kisselle, Raisch & Choate

[57] ABSTRACT

A transparent gauge for use in accurately checking and setting the height and angular position of tool holding blocks utilized for the holding of tools for the cutting of coal, rock and the like. The device consists of a basic support sheet adjustably supporting a tool block indicator silhouette sheet movable arcuately relative to a sheet bearing angle indicia, all of which can be placed adjacent an actual tool to check angles and to set angles.

7 Claims, 14 Drawing Figures

U.S. Patent  Nov. 7, 1978  Sheet 1 of 2  4,123,848
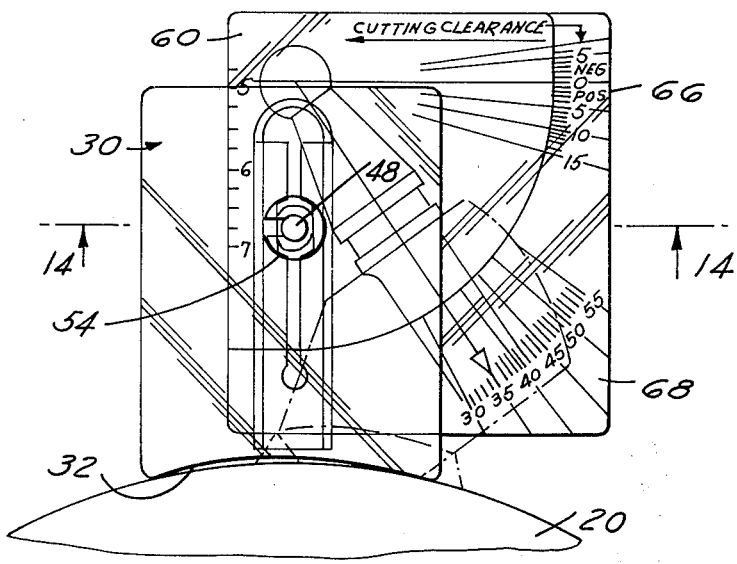
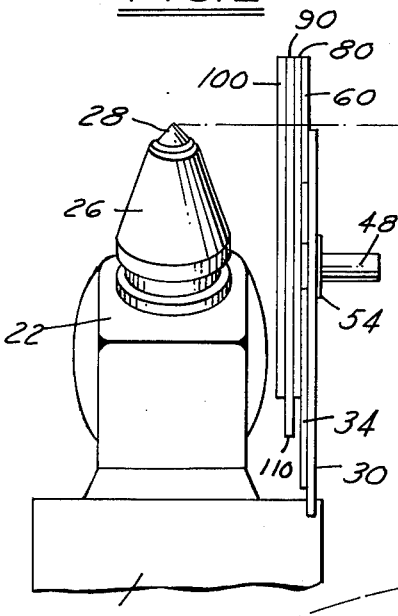
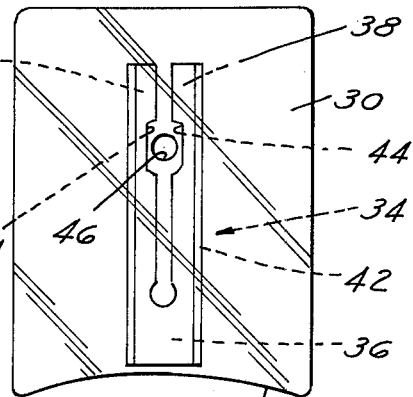
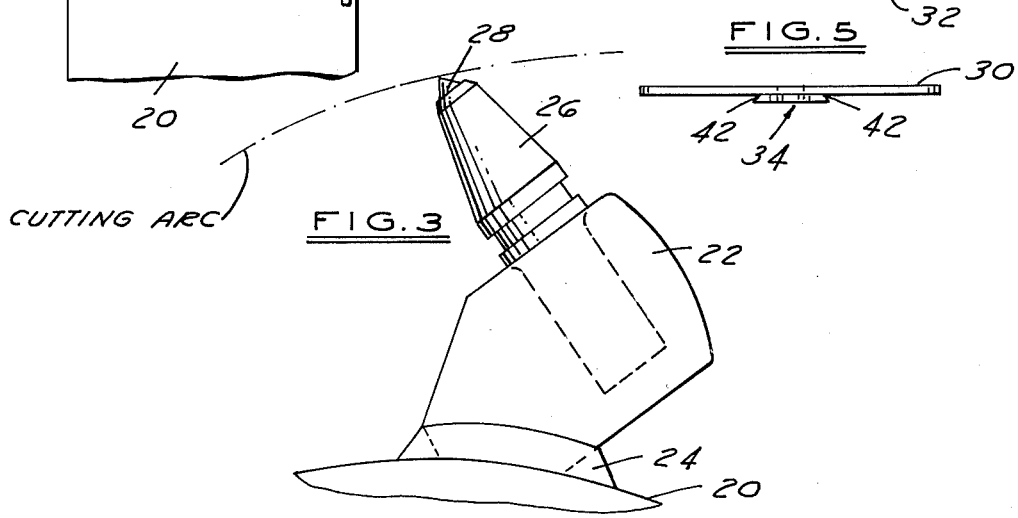

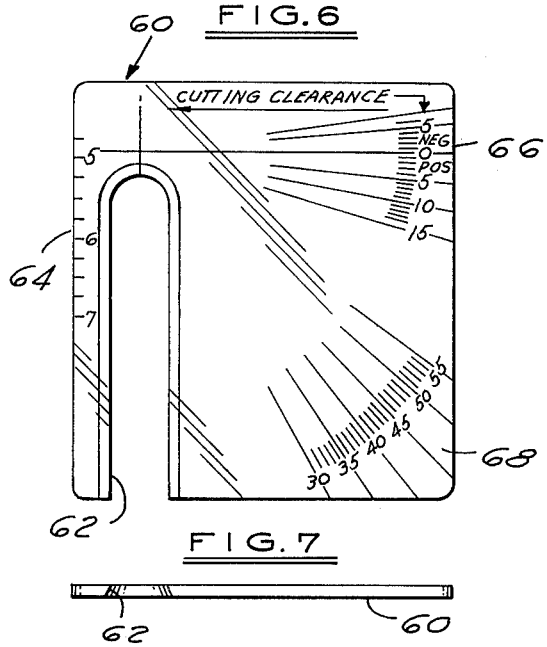
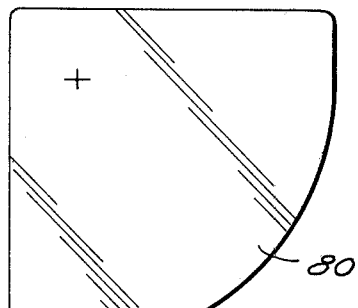
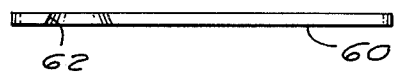
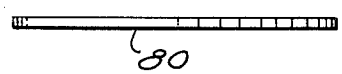
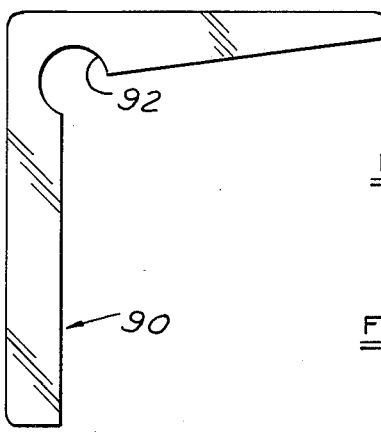
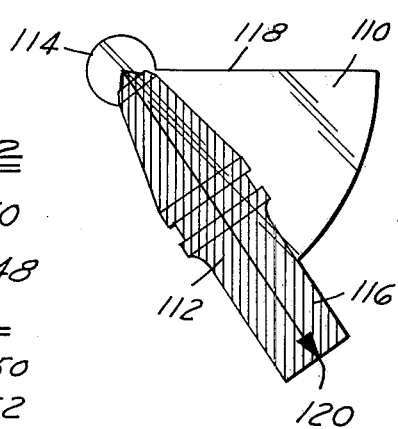
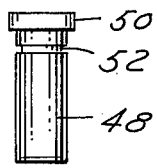
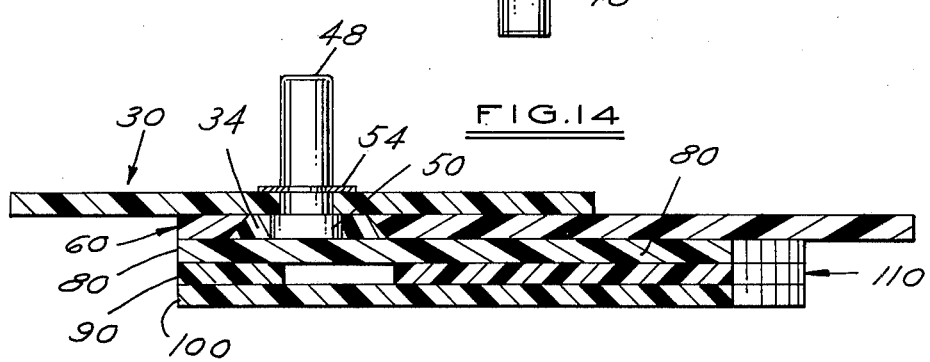

BLOCK PROFILE GAUGE

This invention relates to a Block Profile Gauge and more particularly to a device for use in the setting and the reading of the height, penetration angle, and clearance angles of a mining bit.

Mining bits, particularly of the so-called pick type, which have a sharp point, are mounted on either a rotating wheel which is moved into the mine where material is to be removed, or on a moving chain. These blocks are usually welded in place, and it is frequently desirable to check the orientation of the bit or the height of it before welding the block to the mining machine and also for comparison purposes and for the acquiring of test and performance data.

It is an object of the present invention to provide a simple measuring device which will aid in the checking of a particular bit mounting or in the installation of a particular bit for any desired performance angles.

It is a further object to provide a checking device which is readily carried in the pocket or a brief case and which provides a visual indication, eliminating the need for a computation when used.

Other objects and features of the invention will be apparent in the following description and claims in which the invention is set forth, together with the details which will enable a person skilled in the art to utilize the invention, all in connection with the best mode presently contemplated for the practice of the invention.

DRAWINGS accompany the disclosure and the various views thereof may be briefly described as:

FIG. 1, a side view of the device in a position of use.
FIG. 2, an end view of the device shown in FIG. 1.
FIG. 3, a side view of a mounted tool.
FIG. 4, a side elevation of the mounting plate.
FIG. 5, an end view of the mounting plate.
FIG. 6, a side view of an indicia plate.
FIG. 7, an end view of the indicia plate.
FIG. 8, a side view of a back plate.
FIG. 9, an end view of the back plate.
FIG. 10, a side view of a spacer plate.
FIG. 11, a side view of the tool silhouette plate.
FIG. 12, an end view of a lock pin.
FIG. 13, a side view of a lock pin.
FIG. 14, a sectional view on line 14—14 of FIG. 1.

REFERRING TO THE DRAWINGS:

In FIGS. 1 and 3, a rotating circular body 20 is used for mounting a tool block 22, this being generally welded at 24. The tool block carries a pick type of tool 26, this being removably carried in the block 22 and having a cutting tip 28 which engages coal or other earth materials which are being mined by the power driven equipment. The location of the tip 28 can be critical in the efficient use of the machines in question. It must have a certain height above the mounting member 20, and this should be relatively uniform.

In addition, the angle of the tool is important not only from the point of view of the penetration into the material being mined but also from the point of view of a clearance angle so that the tool behind the tip is not scraping in areas not intended for cutting.

The present invention then is directed to a device which can be used for reading the various critical dimensions on the tool and also for setting these dimensions and angles if it is desired that it be used that way.

The assembled device is illustrated in FIG. 1, there being an end view in FIG. 2 and a sectional view in FIG. 14. However, because of the transparency of the elements, it is considered to be most expedient to describe each element individually before describing the assembly.

In FIG. 4, a transparent mounting plate 30 is shown having an arcuate bottom edge 32, the plate being formed of a transparent plastic material sold on the market as "Plexiglas" (trademark). This plate carries a small elongate dovetailed strip 34 which is adhered by suitable welding or plastic adhesive in the base area 36 to plate 30. The strip 34 is split to provide two arms 38 and 40, each edge of the plate 36 having a receding surface to provide a dovetail groove at 42. A locking cam will function in the notches 44 in arms 38 and 40 to spread these arms to lock the plate relative to other elements of the assembly. The cam is carried in a hole 46 and is illustrated in FIGS. 12 and 13 consisting of a shaft 48 having a cam surface 50. A small groove 52 is provided for a thin plastic snap ring retainer 54 shown in FIGS. 2 and 14.

With reference to FIG. 6, a second element of the structure is illustrated consisting again of a transparent plate 60 having a vertical slot 62 with receding side edges to cooperate with the dovetail groove 42 formed by plates 30 and 34. Height indicia in inches is provided at 64 on the left-hand edge of the plate 60. At the top right-hand corner cutting clearance angles are inscribed with suitable indicia at 66, and at the left-hand bottom corner are inscribed tool penetration angles and indicia at 68.

Thus, it will be seen that the plate 60 will mount on the plate 30 and be vertically adjustable thereon, it being locked by the turning of the cam 50 which spreads the arms 38 and 40. Behind the plate 60 is a spacer plate 80 which is formed in the shape of a quadrant as shown in FIG. 8.

A second spacer element 90 is shown in FIG. 10 having two arms at right angles which overlie the edges of the quadrant plate 80 and having a partially open sided circular bearing recess 92 in the corner area. A back plate 100, similar in shape to plate 80, overlies the plate 80 spaced therefrom by the L-shaped plate 90. Between the plates 80 and 100 is a silhouette plate 110 which carries a colored portion 112 in the shape of a pick bit. At the end of the bit is a circular extension 114 which is received in the bearing recess 92 of the L-shaped spacer 90.

It will be noticed that the shank end of the bit 116 will project behind the arcuate surfaces of the plates 80 and 100 so that the silhouette 112 of the tool can be rotated between these plates.

When the device is assembled as shown in FIGS. 1, 2 and 14, the plate 30 can position on the carrier element 20, the bottom curvature surface 32 registering on the element 20, and the assembly of plates on the support plate 30 can be adjusted by moving it to the height desired and then, with the turning of the shaft 48, locked by the wedging of the arms 38 and 40 into the groove in plate 60.

Manipulation of the element 116 on the tool silhouette plate 110 will then enable the tool silhouette to be matched up with the actual tool 26-28. The top edge 118 on plate 110 will then serve as an indicator line and register with one of the clearance angle indicia at 66 to show a reading of the cutting clearance of the tool point. The center arrow 120 on the tool silhouette shank 116 (plate 110) can then be positioned in the indicia area 68 so that the penetration angle of the tool can be read. Thus, any pick type tool can be readily scanned by an inspector or an installer to check out the cutting clearance and the height and the penetration angle. If the device is to be utilized for installing tools of this kind, it can be used to obtain the proper height, penetration angle, and cutting clearance by setting the instrument at the desired dimensions and using it as a gauge to assist in the mounting.

We claim:

1. A profile gauge for power driven, block mounted mining tools which comprises:
   (a) a first plate carrying a silhouette of a tool having a tip end to be gauged,
   (b) first means mounting said plate for a lineal height adjustment,
   (c) second means mounting said plate for rotation around the tip end of the tool silhouette to be gauged,
   (d) third means carrying indicia to indicate the relative position of said plate relative to said first and second mounting means,
   (e) said second means comprising an assembly of a pair of plates separated by a spacer to provide a slot opening, and
   (f) pivot means to engage said assembly and said first plate to pivot said plate around the tip end of the tool silhouette.

2. A profile gauge as defined in claim 1 in which the first means and the third means comprise transparent plate to allow visibility of said tool silhouette as it moves in an arc around the tip end of the tool silhouette.

3. A profile gauge as defined in claim 2 in which the first plate has an indicator line aligned with the tip clearance profile and an axis line on the tool profile to cooperate with indicia on the third means.

4. A profile gauge for power driven, block mounted mining tools which comprises:
   (a) a first plate carrying a silhouette of a tool having a tip end to be gauged,
   (b) first means mounting said plate for a lineal height adjustment,
   (c) second means mounting said plate for rotation around the tip end of the tool silhouette to be gauged,
   (d) third means carrying indicia to indicate the relative position of said plate relative to said first and second mounting means,
   (e) said second means comprising a plate and spacer to provide a segmental slot opening to receive said first plate, and
   (f) pivot means associating said plates to constrain said first plate in an arcuate motion around the tip end of the tool silhouette.

5. A profile gauge for power driven, block mounted mining tools which comprises an assembly of a plurality of parallel transparent plastic plates including:
   (a) a first mounting plate having a bottom edge to rest on a tool mount,
   (b) a second indicia plate adjustably and slidably associated with said first plate for lineal height adjustment having cutting clearance indicia and tool angle indicia inscribed thereon, and
   (c) a third plate having imprinted thereon a silhouette of a tip end tool pivotally associated with said first and second plates to move arcuately about the tip end of the tool silhouette to register visibly on said indicia the tool tip cutting clearance and the tool angle.

6. A profile gauge for power driven, block mounted mining tools which comprises:
   (a) a first plate carrying a silhouette of a tool having a tip end to be gauged,
   (b) first means mounting said plate for a lineal height adjustment,
   (c) second means mounting said plate for rotation around the top end of the tool silhouette to be gauged,
   (d) third means carrying indicia to indicate the relative position of said plate relative to said first and second mounting means,
   (e) said second means comprising an assembly of a pair of plates, and a spacer separating said plates having a recess formed therein, and
   (f) means on said first plate engageable in said recess to locate said first plate relative to said assembly and restrain said parts to a relative pivotal motion around the tip end of the tool silhouette.

7. A profile gauge for power driven, block mounted mining tools which comprises an assembly of a plurality of parallel transparent plastic plates including:
   (a) a first mounting plate to rest on a tool mount,
   (b) a second indicia plate slidably associated with said first plate for lineal height adjustment,
   (c) a third plate having imprinted thereon a silhouette of a tip end tool rotatably associated with said first and second plates to move arcuately about the tip end of the tool silhouette,
   (d) means to rotatably associate said third plate and said first and second plates comprising a circular projection on said third plate at the tip end of the tool silhouette, and
   (e) means on said indicia plate forming a bearing recess to receive and constrain said projection.

* * * * *